Jan. 5, 1932.  H. H. SHAKELY  1,839,602
COUPLER
Filed June 20, 1928   2 Sheets-Sheet 1

INVENTOR
Howard H. Shakely
By Byrnes, Stebbins & Parmelee,
His Attys.

Jan. 5, 1932. H. H. SHAKELY 1,839,602
COUPLER
Filed June 20, 1928 2 Sheets-Sheet 2
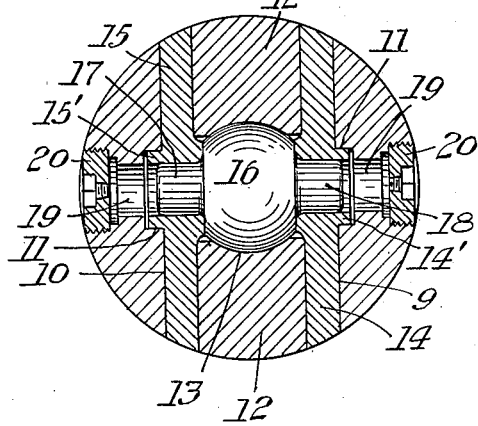
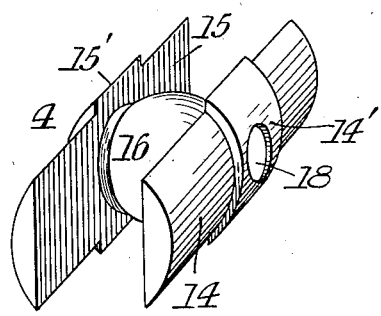
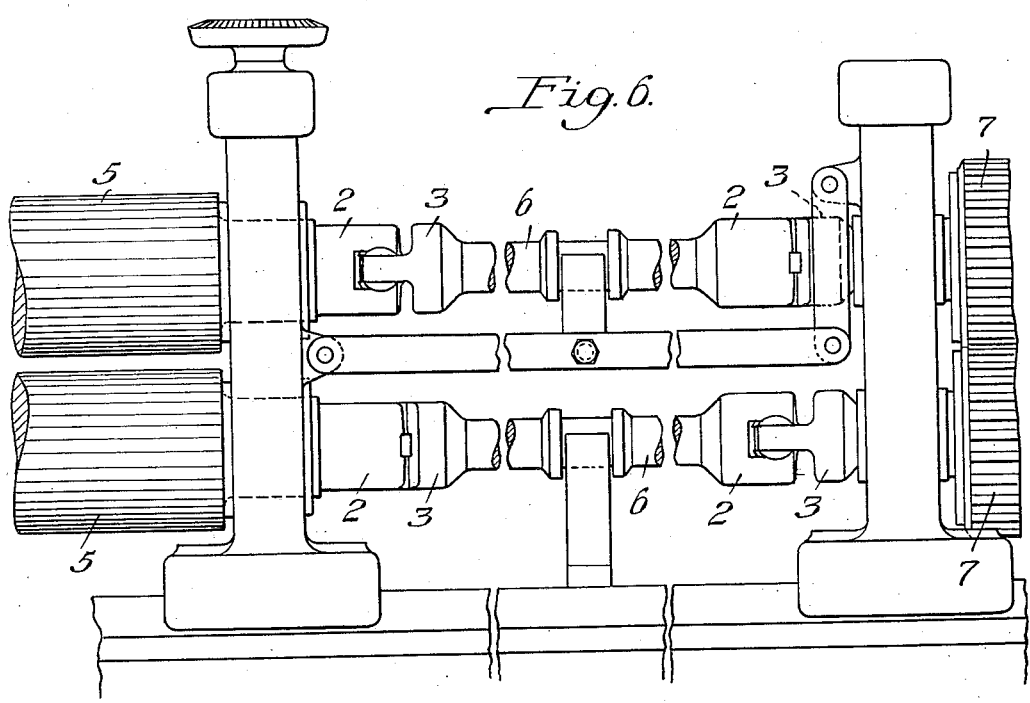
INVENTOR
Howard H. Shakely
By Byrnes, Stebbins & Parmelee
His Attys.

Patented Jan. 5, 1932

1,839,602

UNITED STATES PATENT OFFICE

HOWARD H. SHAKELY, OF PITTSBURGH, PENNSYLVANIA

COUPLER

Application filed June 20, 1928. Serial No. 286,756.

This invention relates to universal couplers, and more particularly to a universal coupler especially adapted for use in connecting the rolls, spindles and gears employed in rolling mills.

An object of the invention is to provide a coupling that will allow a departure from alignment on the part of the axes of the coupled elements, and which also permits their rapid assembly or disassembly.

In the patent to Lorenz Iversen No. 1,359,601, granted November 23, 1920, a universal coupling which may be used in connection with rolling mills is disclosed. In this patent, a coupling unit is described which includes two quadrantal segments of a cylinder spaced apart by a cylindrical stud which has trunnions fitting in holes in the segments concentric with the axis of the stud. This coupling unit is inserted in the female coupling member, and the male coupling member, which is provided with a tongue, is adapted to be rotated around the cylindrical stud.

In the use of universal couplings such as described in the Iversen patent, it has been found that after the coupling has been used for some time, the quadrantal segments of the cylinder, mounted at the ends of the studs, become worn and that after a time the tongue member, which rotates about the stud as an axis, forms a burr on the stud. This prevents the free rotation of the tongue member about the stud and thereby causes the universal coupling to stick, which sticking is only overcome by considerable force exerted on the coupling.

According to my invention, I provide a universal coupling in which the male member, instead of rotating on a cylindrical stud, rotates about a spherical member, so that even if the quadrantal segments or liners of the coupling unit become worn in use, the male member will not at any time burr the spherical member, but is always free to rotate about the member without any tendency for the coupler to bind.

In the drawings, wherein the present preferred embodiment of the invention is shown;

Figure 4 is a transverse vertical section on the line IV—IV of Figure 1;

Figure 5 is a perspective view of the coupling unit employed in my universal coupling; and, Figure 6 is an assembly view showing the coupler applied to the spindles, rolls and pinions of a rolling mill.

Figure 1:
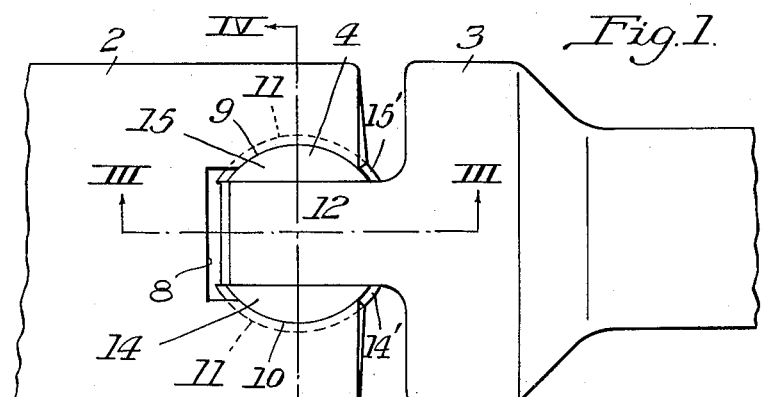
Figure 1 is a plan view of the coupling.

Referring to the preferred embodiment of the invention shown in the drawings, the coupler comprises a female member 2, a male member 3, and a coupling unit 4, the coupling unit being best shown in Figure 5.

As shown in Figure 6, the female coupling member 2 is connected to the upper roll 5 of a rolling mill and the male member 3 is connected to one end of a driving spindle 6. The opposite end of the driving spindle is connected by a similar coupler to the driving pinions 7. The lower roll, spindle and pinion are similarly connected by universal couplers.

Figure 2:
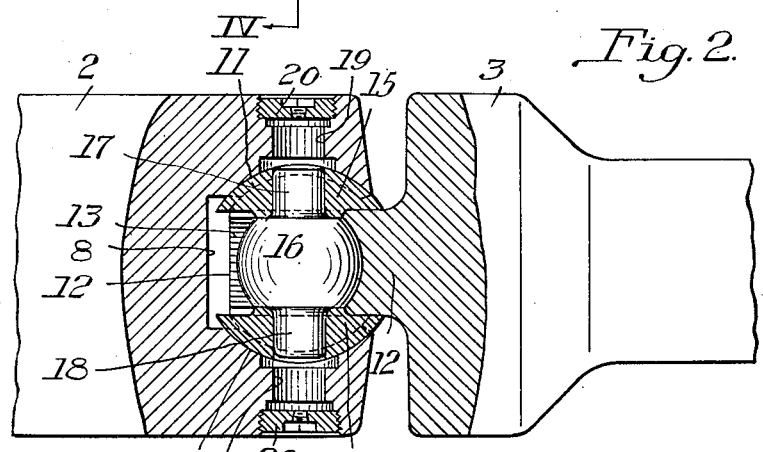
Figure 2 is a horizontal section through the center of the coupling on the line II—II of Figure 3.
Figure 3:
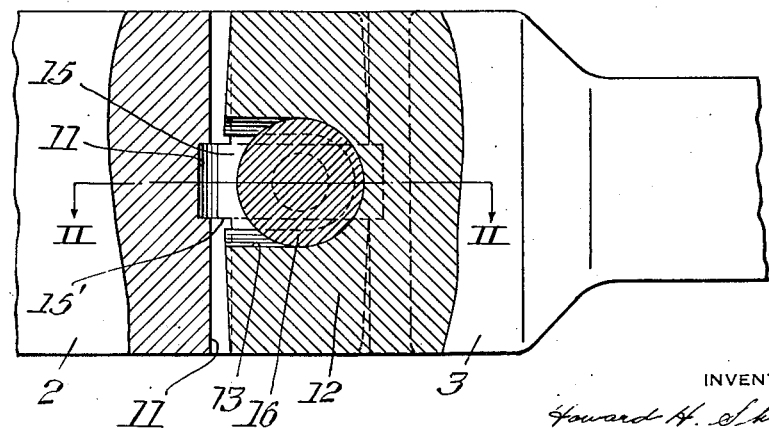
Figure 3 is a longitudinal vertical section on the line III—III of Figure 1.

As shown in Figures 1 to 5, the female coupling member is provided with a transverse slot 8, the top and bottom portions 9 and 10 of the slot being shaped to form a cylinder. The cylindrical portions of the slot 8 are provided with circumferential recesses 11.

The male coupling member 3 is shaped to form a tongue 12, which is provided with a transverse slot 13 adjacent its inner end. This transverse slot is shaped in the form of a sphere.

The coupling unit 4 is adapted to be received in the cylindrical slot 9 formed in the female member. This coupling unit comprises two segmental liners 14 and 15 which are spaced apart by a spherical member 16. The spherical member is provided with trunnions 17 and 18 on which the segmental liners are mounted. The liners are provided with circumferential bosses 14' and 15' which are of a size adapted to fit the circumferential recesses 11 provided in the female member.

The coupler may be kept lubricated by providing openings 19 in the female coupling member 2 which lead to the segmental liners 14 and 15. The openings for grease are closed by screw plugs 20.

In assembling the unit 4 in the cylindrical slots 9 and 10 formed in the female member, the unit is arranged so that the longitudinal axis of the coupling unit extending through the spherical member 16 and the trunnions 17 and 18 is in alignment with the longitudinal axes of the female member and the roll to which the female member is connected and with the segmental liners 14 and 15 aligning with the slot 8. In this position the circumferential bosses 14′ and 15′ provided on the segments 14 and 15 may be inserted into the circumferential groove 11 provided in the female coupling member. When the coupling unit is fully inserted, it is rotated through an angle of 90°, thus disposing the unit in the cylindrical slot 8 of the female member, so that the unit cannot be displaced without rotating it through an angle.

It will be seen that my invention provides a universal coupling in which the tongued male member provided with a spherical slot is adapted to pivot on and rotate in all planes about the spherical member 16. Because of the provision of the circumferential groove 11 in the female member and the provision of the circumferential bosses 14′ and 15′ on the segmental liners, the male member may rotate about an axis extending through the middle of the spherical member 16 and at right angles to the plane of the circumferential groove 11.

Even if the segmental liners 14 and 15 become worn so as to allow play between their inner surfaces and the outer surfaces of the tongued portion 12 of the male member, the male member will be free to rotate about the spherical member 16 without any tendency for it to bind or burr the spherical member. The life of my coupler is therefore much greater than the couplers wherein the male member is pivoted on a cylindrical stud which becomes burred after usage due to the wearing of the segmental liners received in the cylindrical slot in the female member.

It is to be understood that the form of the invention shown and described is to be taken as a preferred example of the same and that the invention may be otherwise embodied without departing from the spirit of the invention or the scope of the following claims.

I claim:

1. A universal coupler comprising a female member provided with a cylindrical slot adapted to receive a coupling unit, and a male member provided with a spherical slot, said coupling unit including a spherical spacing member adapted to be received in the spherical slot of said male member.

2. A universal coupler comprising a female member provided with a slot adapted to receive a coupling unit, a portion of the slot being formed in a cylinder, a male coupling member provided with a spherical slot, said coupling unit including a spherical member provided with trunnions, segmental liners mounted on the trunnions and adapted to be received in said cylindrical portion, said spherical member being adapted to be received in said spherical slot.

3. In a universal coupling, the combination with a female member provided with a cylindrical slot and a male member provided with a spherical slot, of a coupling unit arranged in said cylindrical slot and comprising a spherical member provided with trunnions, said spherical member being received in the slot in the male member, and segmental liners mounted on said trunnions.

4. In a universal coupling, the combination with a female member provided with a cylindrical slot and a circumferential groove, of a male member and a coupling unit, said coupling unit comprising a spherical member provided with trunnions, and segmental liners mounted on said trunnions, said liners being provided with circumferential bosses adapted to be received in the circumferential groove.

5. In a universal coupling, the combination with a female member provided with a cylindrical slot and a circumferential groove, of a male member provided with a spherical slot, and a coupling unit, said coupling unit comprising a spherical member provided with trunnions, and segmental liners mounted on said trunnions, said liners being provided with circumferential bosses adapted to be received in the circumferential groove.

6. A universal coupling comprising a female member provided with a cylindrical slot containing a coupling unit, said unit having segments spaced apart by a spherical spacer, and a male member provided with a spherical slot to receive said spacer, whereby all driving strain is relieved from said spacer.

In testimony whereof I have hereunto set my hand.

HOWARD H. SHAKELY.